United States Patent
Keyes et al.

(10) Patent No.: US 10,142,017 B1
(45) Date of Patent: Nov. 27, 2018

(54) BEACON DEMODULATION WITH BACKGROUND SUBTRACTION

(71) Applicant: X Development LLC, Mountain View, CA (US)

(72) Inventors: Edward Keyes, Mountain View, CA (US); Oliver Bowen, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/486,692

(22) Filed: Apr. 13, 2017

Related U.S. Application Data (60) Provisional application No. 62/438,157, filed on Dec. 22, 2016.

(51) Int. Cl.
  *H04B 10/27* (2013.01)
  *H04B 10/112* (2013.01)
  *G06T 5/50* (2006.01)
  *G06T 7/70* (2017.01)

(52) U.S. Cl.
  CPC .............. *H04B 10/112* (2013.01); *G06T 5/50* (2013.01); *G06T 7/70* (2017.01); *G06T 2207/10016* (2013.01); *G06T 2207/20216* (2013.01); *G06T 2207/20224* (2013.01)

(58) Field of Classification Search
  CPC .... H04B 10/11; H04B 10/1129; H04B 10/27; H04B 10/271
  See application file for complete search history.

(56) References Cited

U.S. PATENT DOCUMENTS

| | | | |
|---|---|---|---|
| 7,460,689 B1 * | 12/2008 | Chan | G06K 9/3241 375/240.16 |
| 7,991,294 B2 | 8/2011 | Dreischer et al. | |
| 9,418,115 B2 | 8/2016 | Ganick et al. | |
| 9,444,547 B2 | 9/2016 | Ganick et al. | |
| 2015/0147067 A1 | 5/2015 | Ryan et al. | |
| 2016/0005154 A1 * | 1/2016 | Meyers | G06T 5/007 382/274 |
| 2016/0195605 A1 | 7/2016 | Ryan et al. | |
| 2017/0146454 A1 * | 5/2017 | Knox | G01N 21/49 |
| 2017/0228874 A1 * | 8/2017 | Roberts | G06T 7/20 |

OTHER PUBLICATIONS

Kuo et al., Luxapose: Indoor Positioning with Mobile Phones and Visible Light, MobiCom'14, Sep. 7-11, 2014, pp. 447-458, Maui, Hawaii, USA.

* cited by examiner

*Primary Examiner* — Dzung Tran
(74) *Attorney, Agent, or Firm* — Lerner, David, Littenberg, Krumholz & Mentlik, LLP (57) ABSTRACT

Aspects of the disclosure provide for a method for determining a position of a beacon. A plurality of frames comprising pixel values is collected. Each frame is an image of a location. A static background of the location is determined by averaging the pixel values of the plurality of frames, pixel difference values are determined for each frame by subtracting the determined static background from the pixel values of each frame. Using the pixel difference values for each frame in the plurality of frames, a first subset of frames and a second subset of frames are identified. An average pixel difference is then determined by averaging the pixel difference values of the first subset of frames and an inverse of the pixel difference values of the second subset of frames. Using the average pixel difference, the position of a beacon at the location is determined.

20 Claims, 9 Drawing Sheets

BEACON DEMODULATION WITH BACKGROUND SUBTRACTION

CROSS-REFERENCE TO RELATED APPLICATIONS

The present application claims the benefit of the filing date of U.S. Provisional Patent Application No. 62/438,157 filed Dec. 22, 2016, the disclosure of which is hereby incorporated herein by reference.

BACKGROUND

Communication terminals may transmit and receive optical signals through free space optical links. In order to accomplish this, such terminals generally use acquisition and tracking systems to establish the optical link by pointing optical beams toward one another. For instance, a transmitting terminal may use a beacon laser to illuminate a receiving terminal, while the receiving terminal may use a position sensor to locate the transmitting terminal to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for a method. The method includes collecting, by one or more processors, a plurality of frames comprising pixel values, each frame being an image of a location; determining, by the one or more processors, a static background of the location by averaging the pixel values of the plurality of frames; determining, by the one or more processors, pixel difference values for each frame by subtracting the determined static background from the pixel values of each frame; identifying, by the one or more processors, a first subset of frames and a second subset of frames using the pixel difference values for each frame in the plurality of frames; determining, by the one or more processors, an average pixel difference by averaging the pixel difference values of the first subset of frames and an inverse of the pixel difference values of the second subset of frames; and determining, by the one or more processors, a position of a beacon at the location using the average pixel difference.

In one example, the method also includes controlling, by the one or more processors, a pointing hardware in relation to the position of the beacon. In another example, the first subset of frames represent "on" frames in which a beacon is likely on, and the second subset of frames represent "off" frames in which a beacon is likely off.

In a further example, the first and second subsets of frames are identified based on by determining at least one (i) a first sign of a greatest absolute pixel difference value of a given frame, (ii) a second sign of a sum of the pixel difference values of the given frame, (iii) a third sign of an average of the pixel difference values of the given frame, and (iv) a fourth sign of a cluster of pixel difference values of the given frame. In this example, the given frame is identified as one of the first subset of frames when a given sign is positive, and the given frame is identified as one of the second subset of frames when a given sign is negative.

In yet another example, the static background of the location is further determined by storing the static background in a memory, and updating the static background when a new frame is collected using pixel values of the new frame. In another example, the method also includes establishing, by the one or more processors, a communication link with a system associated with the beacon when the position of the beacon is determined. Optionally, the beacon is a first beacon and the method also includes transmitting, by the one or more processors, a second beacon. In this option, the second beacon is modulated in a square wave that is off for a first period of time when the first beacon is on and a portion of a second period of time when the first beacon is off.

Other aspects of the disclosure provide for a system. The system includes an optical system configured to collect a plurality of frames comprising pixel values, each frame being an image of a location and one or more processors. The one or more processors are configured to determine a static background of the location by averaging the pixel values of the plurality of frames; determine pixel difference values for each frame by subtracting the determined static background from the values of each frame; identify a first subset of frames and a second subset of frames using the pixel difference for each frame in the plurality of frames; determine an average pixel difference by averaging the first subset of frames and an inverse of the second subset of frames; and determine a position of a beacon in the location using the average pixel difference.

In one example, the system also includes a pointing hardware configured to move the optical system based on the determined position of the beacon. In another example, the first subset of frames represent "on" frames in which a beacon is likely on, and the second subset of frames represent "off" frames in which a beacon is likely off.

In a further example, the first and second subset of frames are identified based on by determining at least one of (i) a first sign of a greatest absolute pixel difference value of a given frame, (ii) a second sign of a sum of the pixel difference values of the given frame; (iii) a third sign of an average of the pixel difference values of the given frame, and (iv) a fourth sign of a cluster of pixel difference values of the given frame. In this example, the given frame is identified as one of the first subset of frames when a given sign is positive, and the given frame is identified as one of the second subset of frames when a given sign is negative.

In yet another example, the static background of the location is further determined by storing the static background in a memory, and updating the static background when a new frame is collected using pixel values of the new frame. In another example, the one or more processors are further configured to establish a communication link with a second system associated with the beacon when the position of the beacon is determined. In a further example, the system also includes a communication terminal on which the optical system and the one or more processors are mounted. In this example, the communication terminal is a high-altitude platform.

Further aspects of the disclosure provide for a non-transitory, tangible computer-readable storage medium on which computer readable instructions of a program are stored. The instructions, when executed by one or more computing devices, cause one or more computing devices to perform a method. The method includes collecting a plurality of frames comprising pixel values, each frame being an image of a location, determining a static background of the location by averaging the pixel values of the plurality of frames, determining pixel difference values for each frame by subtracting the determined static background from the pixel values of each frame, identifying a first subset of frames and a second subset of frames using the pixel difference values for each frame in the plurality of frames, determining an average pixel difference by averaging the pixel difference values of the first subset of frames and an inverse of the pixel difference values of the second subset of frames, and determining a position of a beacon at the location using the average pixel difference.

In one example, the method also includes controlling a pointing hardware in relation to the position of the beacon. In another example, the static background of the location is further determined by storing the static background in a memory, and updating the static background when a new frame is collected using pixel values of the new frame. In a further example, the method also includes establishing a communication link with a system associated with the beacon when the position of the beacon is determined.

DETAILED DESCRIPTION

OVERVIEW

The technology relates to detecting a free-space optical beacon through demodulation and background subtraction. Detecting a beacon requires the ability to distinguish the beacon from other objects in the surrounding environmental noise. Once the beacon is detected, a communication link can be established between the device transmitting the beacon and the device receiving the beacon.

A transmitted beacon beam is modulated over time. The frequency of the modulation may be selected to be slower than the frame rate of the receiver being used to detect the beacon beam. On the receiving end, the receiver is configured to collect frames at a particular frequency. A batch of frames, such as two dozen or so frames that may correspond to one or more cycles of a beacon beam on/off cycle, is collected by the optical system while the optical system is pointed at a fixed location. The optical system may include one or more light position sensing device.

To remove surrounding environmental noise from the collected frames, an estimate of the static background is constructed by averaging all the collected frames together. The estimate may include roughly a half-intensity beacon. Then the average is subtracted from each frame in the batch of frames to determine a difference from average.

Each frame is then identified as either an "on" frame, in which the beacon likely on, or an "off" frame, in which the beacon likely off, based on the sign of the difference from average of the pixels of each frame. A frame may be determined as an "on" frame when the sign of the largest single-pixel difference is positive, the sign of the sum or average of all pixel differences is positive, or the sign of a cluster of pixel differences is positive. Conversely, a frame may be determined as an "off" frame when the sign of the largest pixel difference, the sum or average of all pixel differences, or the cluster of pixel differences is negative.

To further distinguish the beacon from the surrounding environmental noise, the differences from average of the "on" frames and the inverse of the differences from average of the "off" frames" are averaged. Using the average of the differences, the beacon position in the frame is determined, from which the beacon position in space is estimated. Spot centroiding or other techniques may be used to determine the beacon position in the frame. Based on the determined beacon position in space, the pose of the optical system may be adjusted and/or a communication link may be established between a transmitting communication device that transmits the beacon and a receiving device communication that receives the beacon.

In addition, as discussed in detail below, the features described herein allow for various alternatives.

EXAMPLE SYSTEMS

A global-scale communication network may include optical communication links used to transfer data between communication devices. The communication devices may be positioned on buildings, on the ground, or on moving devices (e.g., gimbal devices arranged on high-altitude platforms or satellites). As such, the communication links are used to transfer the data between the buildings, the ground, and the moving devices. Each optical link allows for communication between two communication devices. A transmitting communication device is configured to transmit an optical beam, while a receiving communication device is configured to detect the optical beam from the transmitting communication device and thus form the communication link Referring to FIG. 1, a global-scale communication network 100 includes a variety of communication devices 200, e.g., 200a, 200b, 200c, 200d, 200e, and 200f, associated with communication terminals such as, for example, stationary communication terminals 300, satellites 400, and high-altitude platforms (HAP) 500, such as an airplane 500a. The network 100 may also include HAPs 500 that operate at high altitudes (e.g., 17-22 km). For instance, HAPs 500 may be released into the earth's atmosphere, e.g., by an air craft, or flown to the desired altitude. The communication devices 200a-f may communicate directly or indirectly with one another. The stationary communication terminals 300 may be building stationary terminals 300a located on the rooftop of buildings or ground stationary terminal 300b located on the ground. The stationary communication terminals 300 may receive a communication signal 20 from another stationary terminal 300, a satellite 400, or a HAP 500, and reroute the communication signal 20 to another stationary terminal 300, a satellite 400, or a HAP 500, or in some examples, to one or more user devices 110, 120, each of which may be associated with a user 112, 122. The satellite 400 may be in Low Earth Orbit (LEO), Medium Earth Orbit (MEO), or High Earth Orbit (HEO), including Geosynchronous Earth Orbit (GEO).

Figure 1:
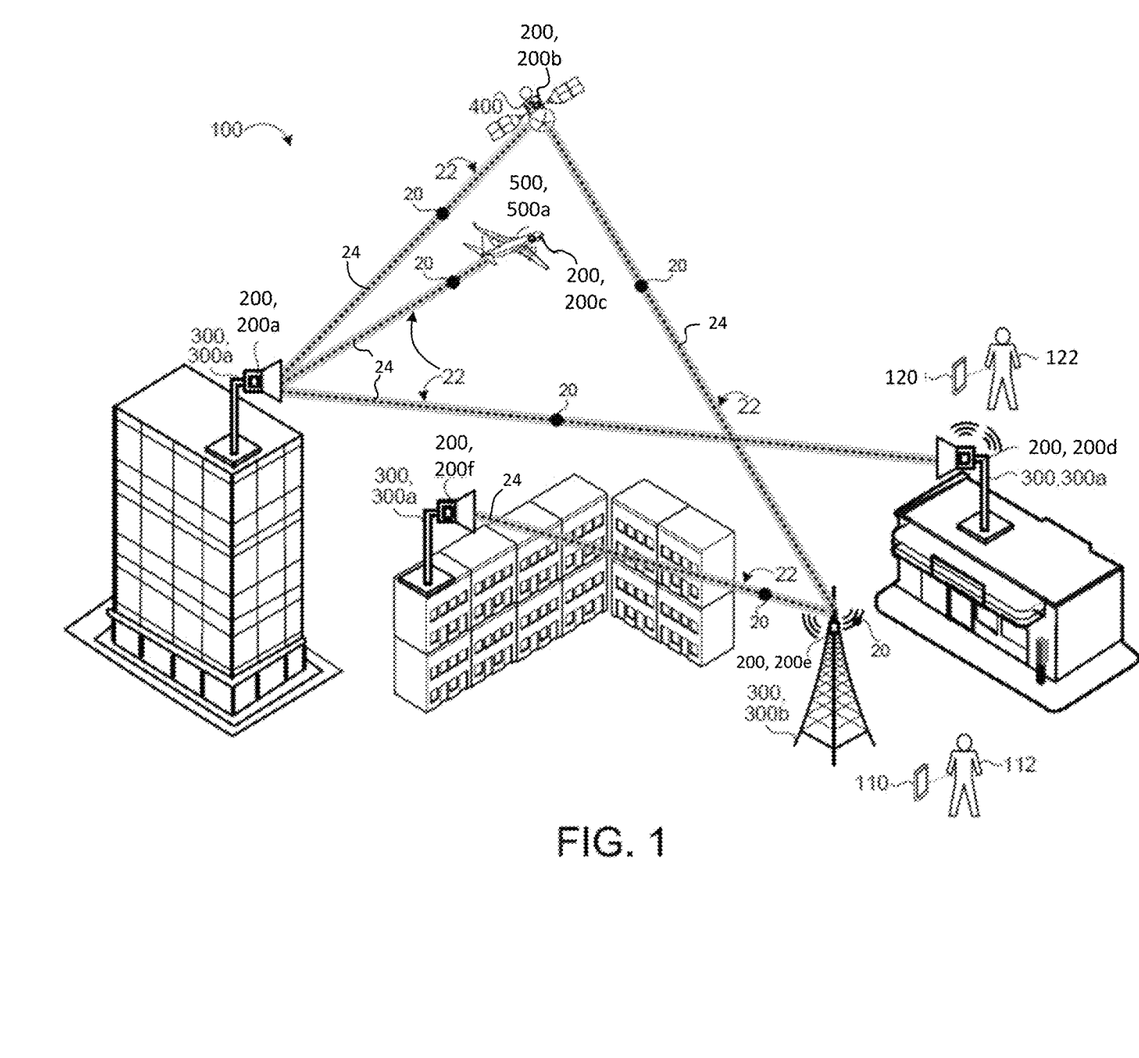
FIG. 1 is a pictorial diagram of an example communication network in accordance with aspects of the disclosure.

The global-scale communication network 100 uses free-space optical communication (FSOC), an optical communication technology that uses light propagating in free space to wirelessly transmit data for telecommunication or computer networking. Therefore, the global-scale communication network 100 transmits a communication signal 20 wirelessly between two communication terminals 300, 400, 500 using an FSOC link or an FSOC network.

A communication device 200 is included in each of the stationary communication terminals 300, the satellites 400, and the HAPs 500 that use FSOC. The communication devices 200a-f may be configured to establish an optical communication link 22 between two communication terminals 300, 400, 500 allowing a communication signal 20 to be transmitted from one communication terminal 300, 400, 500 to another. Once a communication link 22 is established between two communication devices 200, then a transmitting communication device, such as 200a, may transmit a communication signal 20 to a receiving communication device, such as 200b. In some examples, when a transmitting communication device, such as 200a, transmits a communication beam to establish a communication link 22 with a receiving communication device, such as 200b, it is desirable that the transmitting communication device 200a accurately transmits the communication beam so that the receiving communication device 200b accurately receives the communication beam. In some implementations, a 0.001-degree accuracy may be needed to correctly establish the communication link 22.

As further illustrated in FIG. 1, a beacon beam 24 (dotted line) may be transmitted from the transmitting communication device 200 to establish the communication link 22 with the receiving communication device 200. Specifically, communication device 200a may be a transmitting communication device, and communication device 200b, 200c, or 200d may be a receiving communication device, and vice versa. In addition, communication device 200b may be a transmitting communication device, and communication device 200e a receiving communication device, and vice versa. Communication device 200e may also be a transmitting communication device, and communication device 200f a receiving communication device, and vice versa. The beacon beam 24 may illuminate a larger solid angle in space than the optical beam used in the communication link 22, allowing the second communication device 200 to better locate the beacon beam 24. The first communication device 200 may align the beacon beam 24 co-linearly with the optical communication beam (not shown) that has a narrower angle than the beacon beam 24 and carries the communication signal 20. As such, when the receiving communication device 200 receives the beacon beam 24, the receiving communication device 200 may close a communication loop establishing a line-of-sight with the transmitting communication device 200. As a result, the communication link 22 that allows for the transmission of the optical communication beam (not shown) is established.

Figure 2:
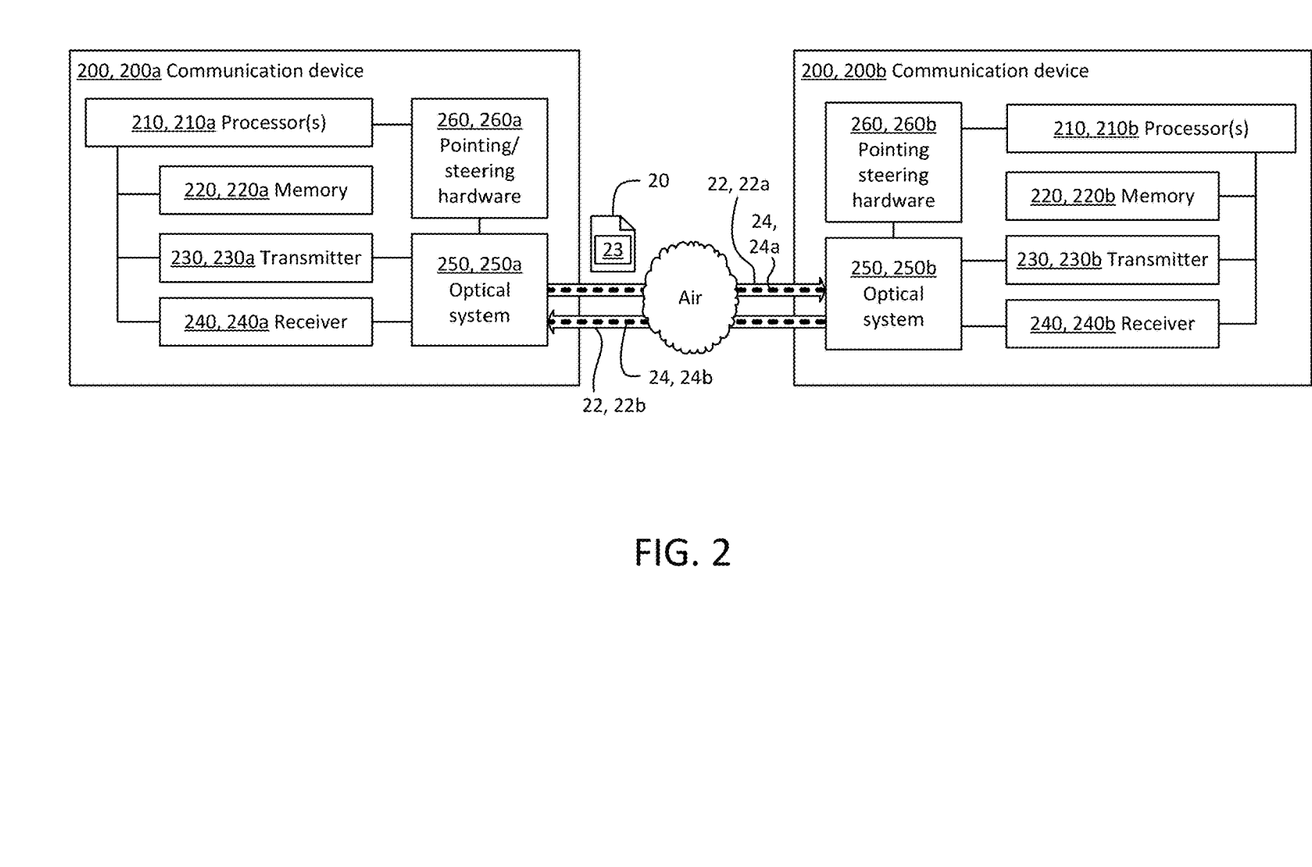
FIG. 2 is a functional diagram of an example communication system in accordance with aspects of the disclosure.

Referring to FIG. 2, in some implementations, the communication network 100 provides a communication signal 20 between two communication devices 200, e.g., a first communication device 200a and a second communication device 200b through a free space optical link 22. The communication signal 20 may include data 23, such as, for example, internet protocol packets, being routed through the global-scale communication network 100. Each communication device 200, 200a, 200b may include one or more processors 210, e.g., 210a or 210b, a memory 220, e.g., 220a or 220b, a transmitter 230, e.g., 230a or 230b, a receiver 240, e.g., 240a or 240b, an optical system 250, e.g., 250a or 250b, and pointing hardware 260, or steering hardware, e.g., 260a or 260b. In examples where a communication device 200 is mounted to a stationary ground terminal 400, such as a building or other non-moving or slow moving structure, the communication device 200 may not include pointing hardware 260.

The one or more processors 210 is operatively coupled with memory 220 that stores information, such as, for example, instructions executable by the one or more processors 210, non-transitorily at the one or more processors 210. The one or more processors 210 may also be in communication with the transmitter 230 and the receiver 240. The one or more processors 210 may therefore be configured to transmit, via the transmitter 230, communications and data 23 in the form of optical beams, and also may be configured to receive, via the receiver 240, communications and data 23 in the form of optical beams. Received optical beams may be processed by the one or more processors 210 to extract the communications and data 23.

The one or more processors 210 may further be configured to determine a position error of an optical system 250 indicative of a misalignment of an optical beam transmitted between two optical systems 250. A first optical system 250a of the first communication device 200a and a second optical system 250b associated with the second communication device 200b. As such, the one or more processors 210 may determine an adjusted position of the first optical system 250a and/or the second optical system 250b to establish a link 22a and/or 22b. Furthermore, the one or more processors 210 may be associated with the pointing hardware 260 (e.g., a gimbal) for adjusting the optical system 250, and may be configured to provide pointing adjustments of the optical system 250. The pointing hardware 260 may be configured to move in at least two degrees of freedom, such as, for example, yaw and pitch. The adjustments to the optical system 250a and/or the optical system 250b may be made to establish acquisition and connection link between the first communication device 200a and the second communication device 200b. In some implementations, the one or more processors 210 may provide closed loop control for the optical system 250 to adjust optical beam pointing based on the receiver 240 at the receiving communication device based upon the signal strength for an optical beam received over the communication link 22 from the transmitting communication device.

The transmitter 230 may be a semi-conductor device, such as, for example, a light-emitting diode (LED) or a laser diode. In some examples, the transmitter 230 may be a fiber laser or a solid state laser. Laser diodes may be directly modulated. In particular, the light output may be controlled by a current applied directly to the transmitter 230. The transmitter 230 may be a single-mode laser diode that supports one optical mode, or the transmitter 230 may be a multimode laser diode that supports multiple-transverse optical modes. The transmitter 230 may receive a modulated communication signal 20 from a modulator (not shown), which in turn receives an electrical signal, and modulates the electrical signal. The transmitter 230 may receive the modulated electrical signal, convert the electrical signal into an optical communication beam, and output the optical communication beam into an optical fiber towards the optical system 250. The transmitter 230 is also configured to output a beacon beam 24 that allows one communication device to locate another. For example, transmitter 230a of the first communication device 200a may output a beacon beam 24a to locate the second communication device 200b and establish a communication link 22a with the second communication device 200b. The transmitter 230b of the second communication device 200b may similarly output a beacon beam 24b to locate and establish a communication link 22b with the first communication device 200a. As such, the communication link 22a, 22b may allow for communication signal 20 between the two communication devices 200a and 200b.

The receiver 240 includes a light position sensing device to detect the optical beam 210. In some examples, the light position sensing device includes, but is not limited to, a lateral position device, a charge-coupled Device (CCD) camera, a photodetector, a quad-cell, or a CMOS image sensor to detect the optical beacon laser. The receiver 240 converts the received optical beam 210 into an electric signal using the photoelectric effect.

The optical system 250 may be configured to transmit the optical beams, such as, for example, optical communication beam (not shown) or beacon beam 24, as well as receive the optical beams and provide the received optical beams to the receiver 240. For receiving optical beams, the optical system 250 and/or the receiver may include, but are not limited to, a de-multiplexer, an optical pre-amplifier, photodiodes, the photo receiver, transimpedance amplifiers, clock/phase recovery circuits, decision circuits, and/or forward error correction circuits.

Configurations of the optical system 250 may include transmitter optics that are separate from receiver optics. As such, communication link 22a may be formed between transmitter optics of one communication device and receiver optics of another communication device. For example, the first communication device 200a may form a communication link 22a with the second communication device 200b using transmitter optics in optical system 250a of the first communication device 200a and receiver optics in optical system 250b of the second communication device 200b. The transmitter optics in optical system 250a at the first communication device 200a may transmit a beacon beam 24a, which the receiver optics in optical system 250b at the second communication device 200b locates and identifies to form a communication link 22a. Once the communication link 22a is formed, the one or more processors 210a can send communications 20 to the second communication device 200b. Similarly, the transmitter optics in optical system 250b at the second communication device 200b may transmit an optical beacon beam 24b, which the receiver optics in optics system 250a at the first communication device 200a locates and identifies to form a communication link 22b. Once the communication link 22b is formed, the one or more processors 210b can send communication signals 20 to the first communication device 200a. In some examples, it is sufficient to establish one communication link 22 between the first and second communication devices 220a, 220b, via the optical systems 250a and 250b, which allows for the bi-directional transmission of data 23 between both devices 200a, 200b.

Figure 3A:
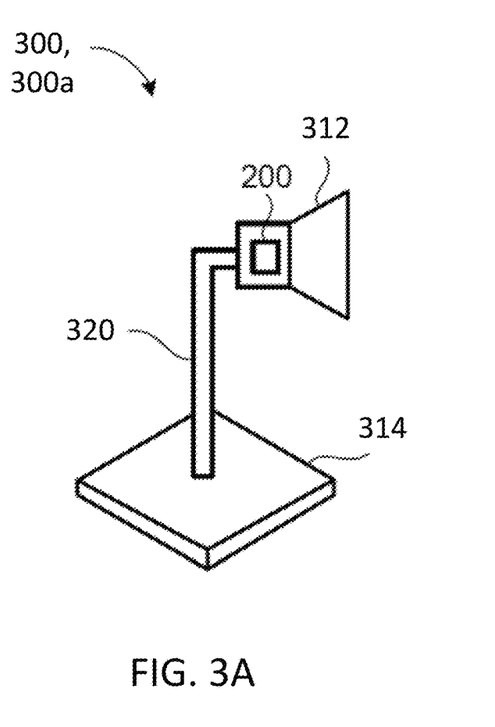
FIGS. 3A and 3B are pictorial diagrams of example stationary communication terminals in accordance with aspects of the disclosure.
Figure 3B:
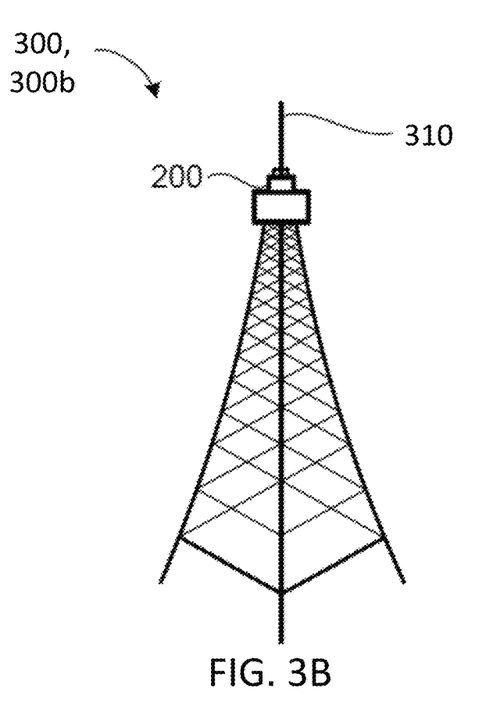

Referring to FIGS. 3A and 3B, in some implementations the communication terminal 300 includes one of the communication devices 200 that receives the communication signal 20 from another communication terminal 300, a satellite 400, or a HAP 500 and transmits the communication signal 20 to a further communication terminal 300, satellite 400, or HAP 500. FIG. 3A illustrates an example building stationary terminal 300a that includes a base 314 and a reflector 312 supported by the base 314 via support member 320. The building stationary terminal 300a also includes one of the communication devices 200, and one or more processors 210 (as described above with reference to FIG. 2) in communication with the communication device 200. In one embodiment, the base 314 may mount the building stationary terminal 300a on at least one building. FIG. 3B illustrates an example ground stationary terminal 300b that also includes an antenna 310, a communication device 200, and one or more processors 210. In some implementations, two stationary communication terminals 300 may establish acquisition and tracking with one another without using position sensors, fast steering mirrors, and/or fast gimbals that are employed by sophisticated acquisition and tracking systems required by communication terminals that move fast and relative to one another.

Figure 4:
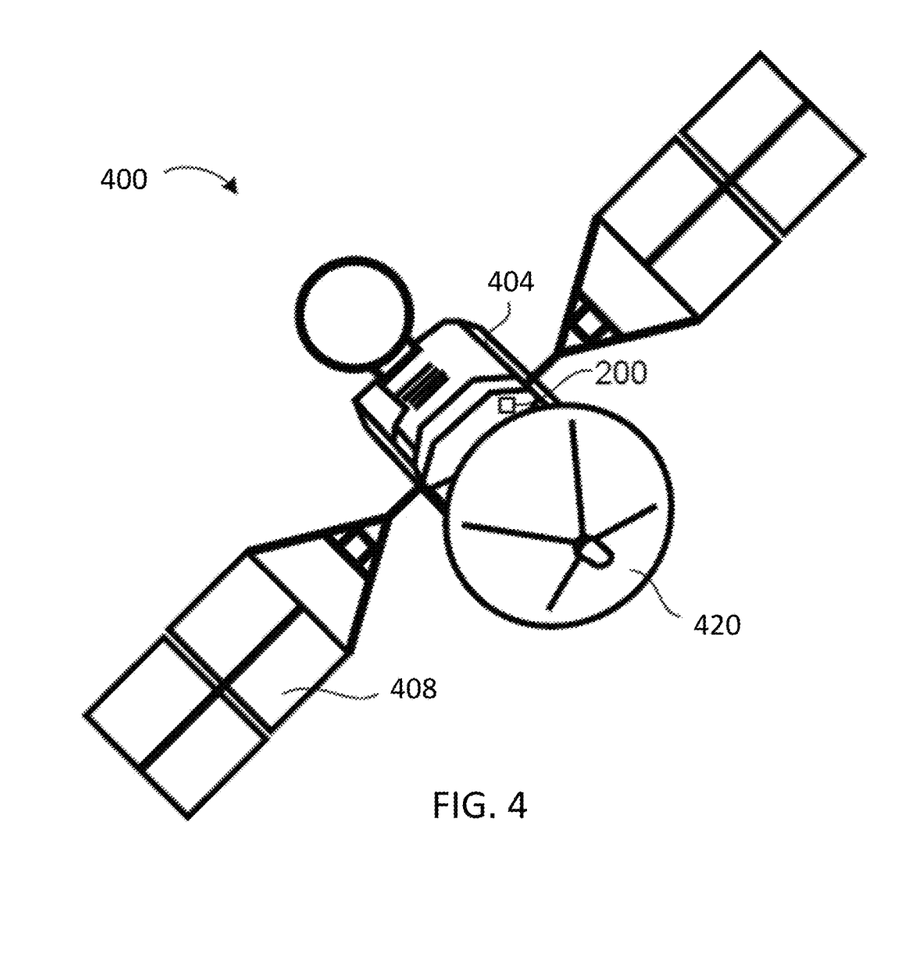
FIG. 4 is a pictorial diagram of an example satellite in accordance with aspects of the disclosure.

Referring to FIG. 4, satellite 400 may be an object placed into orbit around the earth and may serve different purposes, such as, for example, military or civilian observation satellites, communication satellites, navigation satellites, weather satellites, and research satellites. The orbit of the satellite 400 varies depending in part on the purpose of the satellite 400. Satellite orbits may be classified based on their altitude from the surface of the Earth as Low Earth Orbit (LEO), Medium Earth Orbit (MEO), and High Earth Orbit (HEO). Geosynchronous Earth Orbit (GEO) is a special case of HEO. Geostationary Earth Orbit (GSO, although sometimes also called GEO) is a special case of Geosynchronous Earth Orbit. Satellites 400 placed in the GEO orbit can "stand still" with respect to a certain location on earth. Thus, a person on earth looking at a satellite 400 in the GEO orbit would perceive that the satellite 400 is not moving. Therefore, the satellites 400 in GEO orbit maintain a position with respect to a location on earth. Thus, a stationary terminal 300 communicating with a satellite 400 in the GEO orbit does not need to keep tracking the satellite 400 as the satellite 400 moves, the stationary terminal 300 only needs to point to a direction of the satellite 400 in its stationary position with respect to the stationary terminal 300.

In some implementations, the satellite 400 includes a satellite body 404 having a payload that includes one of the communication devices 200. The satellite 400 may also include solar panels 408 mounted on the satellite body 404 for providing power to the satellite 400. In some examples, the satellite 400 may include rechargeable batteries used when sunlight is not reaching and charging the solar panels 408. The satellite 400 may include an antenna 420 for receiving and transmitting the communication signal 20 as well as a reaction control system (RCS) that uses thrusters to adjust the altitude and translation of the satellite 400 making sure that the satellite 400 stays in its orbit. The RCS may provide small amounts of thrusts in one or more directions and torque to allow control of the rotation of the satellite 400 (i.e., roll, pitch, and yaw).

Figure 5A:
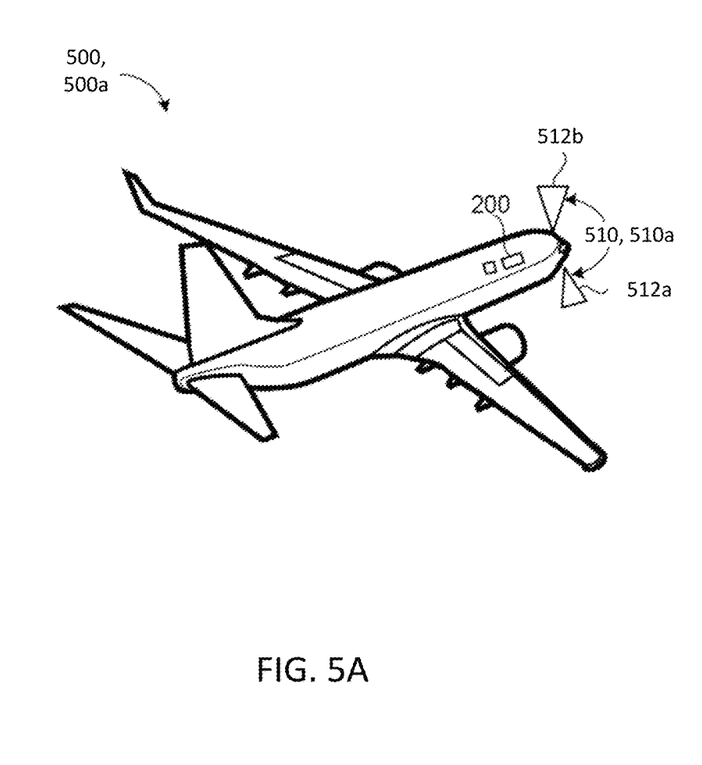
FIGS. 5A and 5B are pictorial diagrams of example high-altitude platforms in accordance with aspects of the disclosure.
Figure 5B:
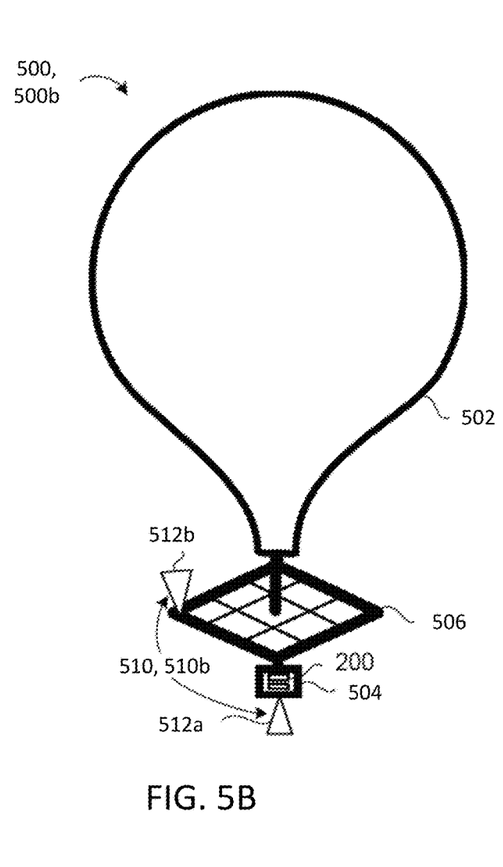

Referring to FIGS. 5A and 5B, in some implementations, the HAP 500, e.g., 500a or 500b, may include the communication device 200. The HAP 500 may include an antenna system 510, e.g. 510a or 510b that receives/transmits a communication signal 20. The antenna system 510 may include a first antenna 512a that receives/transmits a communication signal 20 from a ground terminal 300, and/or a second antenna 512b that receives/transmits a communication from a satellite 400 or another HAP. In some examples, the antenna system 510 of the HAP 500 may be configured to track a position of one or more satellites 400 and/or other HAPs to maintain a communication link 22 between the HAP 500 and the satellite 400 and/or other HAPs.

FIG. 5A illustrates an example aircraft 500a, such as, for example, an unmanned aerial vehicle (UAV) or an aircraft without a human pilot onboard. The UAV may be autonomous, remotely piloted, or both. FIG. 5B illustrates an example communication balloon 500b that includes a balloon 502 (e.g., sized about 49 feet in width and 39 feet in height and filled with helium or hydrogen), an equipment box 504, and solar panels 506. The equipment box 504 may also include batteries to store power and the communication device 200 to communicate with other devices (e.g., other HAPs 500, satellites 400, stationary terminals 300). The solar panels 506 may power the equipment box 504.

Communication balloons 500b may be released in to the earth's stratosphere to attain a desired altitude and to provide connectivity to a ground area at speeds comparable to terrestrial wireless data services (such as, third generation of wireless mobile telecommunications technology, or 3G, and fourth generation of wireless mobile telecommunications technology, or 4G). The communication balloons 500b may float freely in the stratosphere. The communication balloons 500b are carried around the earth by winds and can be steered by rising or descending to an altitude with winds moving in the desired direction.

EXAMPLE METHODS

With reference to FIG. 2, a beacon beam 24a may be transmitted from a first communication device 200a using a transmitter 230a. The beacon beam 24a may be modulated over time, such that the beam is a sine or square wave. The pattern of the beacon beam modulation may be regular or irregular, and may follow a repeating pattern. The frequency of the modulation may be selected to be slower than the frame rate of the optical system 250b being used to detect the beacon. For example, the ratio of the frame rate to the frequency of the modulation may be about 9.5:1 or greater, so that multiple consecutive frames may capture an "on" beacon or an "off" beacon. When the frame rate of the optical system 250b is 5000 frames per second (fps), for instance, the frequency of the modulation may be less than 5000 Hz. As a result, the probability of collecting frames at the optical system 250b showing a full-on or full-off beacon increases. For example, the beacon beam 24a transmitted by one or more processors 210a of first communication device 200a via transmitter 230a and optical system 250a is modulated in a square-wave on/off pattern that repeats. On average, the frequency of the modulation, or one on/off cycle of the beacon beam, is about 500 Hz.

A second communication device 200b may collect a batch of frames using a receiver 240b. The batch of frames, such as two dozen or so frames that may correspond to one or more on/off cycles of a beacon beam, may be collected by the receiver 240b while the optical system 250b is pointed at a fixed location. Each frame is an image having a resolution including a plurality of pixels, and each pixel of each frame has a color value, or pixel value. The image may be grayscale or color. In either case, color values may be lower when the color is darker and higher when the color is lighter. Overall, the values of each frame correspond to a combination of at least background, beacon beam, and the surrounding environmental noise. For example, each frame in the batch of frames may be an image having a resolution of 64×64 of a location in the direction optical system 250b is pointed. The optical system 250b may be configured to capture frames at 5000 fps. For an on/off cycle of the beacon beam modulation having an average frequency of about 500 Hz, the cycle corresponds to about 10 frames. A batch of frames may include about 20 frames corresponding to about two cycles.

Figure 6:
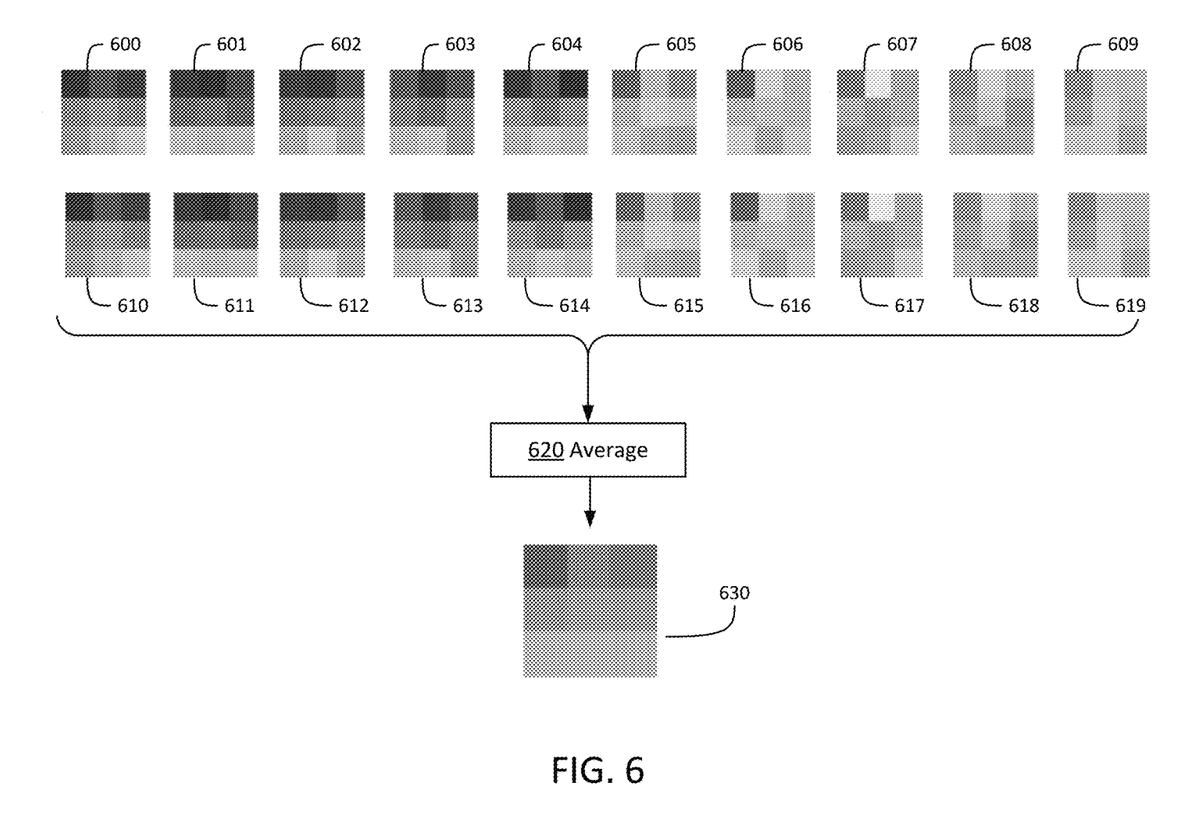
FIG. 6 is a pictorial diagram of example frame processing in accordance with aspects of the disclosure.

As shown in FIG. 6, the one or more processors 210b of the second communication device 200b collect a batch of frames 600-619. Only a 3×3 portion of the collected frames is shown for a clearer illustration. Pixel locations in the 3×3 portion includes top left, top middle, top right, middle left, middle, middle right, bottom left, bottom middle, and bottom right. Frames 600-619 correspond to about two cycles of the beacon beam transmitted from the first communication device 200a. As shown in each frame, each of the nine pixels has a color. Each color corresponds to a color value, or pixel value. Darker shades of color correspond to lower pixel values, such as, for example, 0 for black. Lighter shades of color correspond to higher pixel values, such as, for example, 1 for white.

To estimate the surrounding environmental noise from the collected batch of frames, one or more processors 210b of the second communication device 200b may construct an estimate of the static background by averaging all the collected frames together. Averaging the collected frames includes averaging the pixel values at each pixel location in the collected frames. In other words, pixel values of a pixel in a given location in all collected frames are averaged to obtain an average pixel value for the pixel in the given position. The average pixel value for every pixel location is calculated. The resulting estimate of the static background may be a background frame including the average pixel values at each pixel location. When averaged, the estimate may include the background, surrounding environmental noise, and roughly a half-intensity beacon beam.

As further illustrated in FIG. 6, the surrounding environmental noise in the plurality of frames 600-619 are estimated by averaging the plurality of frames 600-619 at block 620. The result is background frame 630, which represents an estimate of the static background in plurality of frames 600-619. Background frame 630 is a 3×3 frame having nine pixels. The pixel value for a first pixel located in the top left pixel position of background frame 630 is determined by averaging the pixel values of all the first pixels located in the top left pixel position of the plurality of frames 600-619. The pixel values for the rest of the pixels in background frame 630 are determined in the same manner based on the pixel values at the other pixel locations.

To remove the surrounding environmental noise from the collected batch of frames, the one or more processors 210b of the second communication device 200b may subtract the estimate of the surrounding background 630 from each frame in the batch of frames to determine a difference from average. In other words, the difference of a color value of a pixel in a given position of a given collected frame and the average color value of a pixel in the given position of the background frame 630 may be determined for each pixel in of the given collected frame. When the background frame 630 is subtracted, in implementations where darker colors have lower values than lighter colors, pixels that are darker than average will have a negative value, and pixels that are lighter than average will have a positive value.

Figure 7:
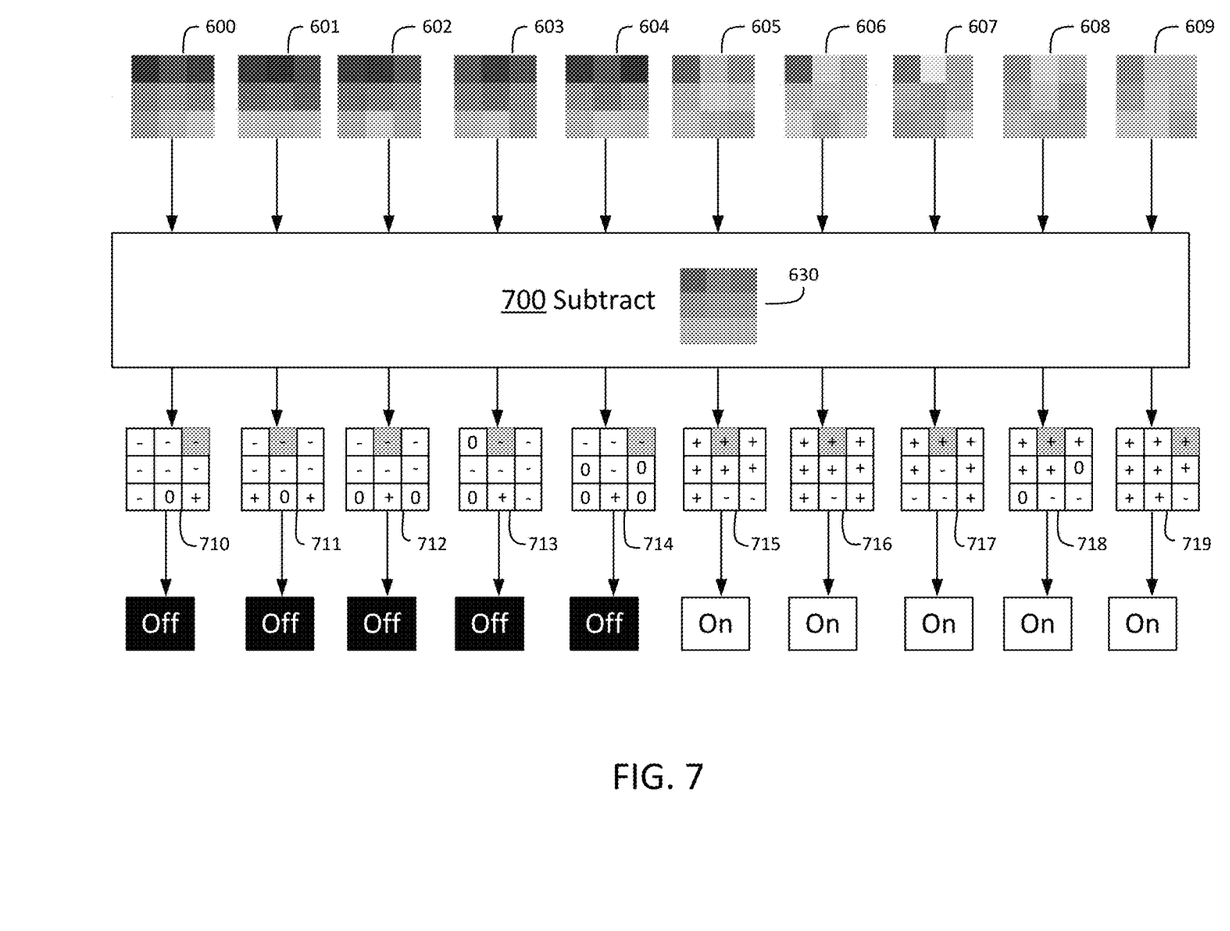
FIG. 7 is a pictorial diagram of another example frame processing in accordance with aspects of the disclosure.

As shown in FIG. 7, background frame 630 may be subtracted from the plurality of frames 600-619 at block 700 to remove the estimated static background. For the sake of simplicity, only the frames 600-609 are depicted and described. The shown difference frames 710-719 that correspond to frames 600-609 respectively. In FIG. 7 only the sign of the pixel value of each pixel in the difference frames 710-719 is shown, though each pixel value also has a magnitude (not shown). Pixels marked with a zero have pixel differences of zero or nearly zero. The pixel value for a first pixel located in the top left pixel position of a difference frame, such as frame 710, is determined by calculating the difference between the pixel value of a first pixel of frame 600 and the first pixel value of background frame 630. The pixel values for the rest of the pixel locations of difference frame 710 are determined in the same manner based on the pixel values at the other pixel locations. This determination is repeated for each of the plurality of frames 601-609 to provide difference frames 711-719.

Each frame 710-719 is then identified by the one or more processors 210*b* of the second communication device 200*b* as either an "on" frame, in which the beacon likely on, or an "off" frame, in which the beacon likely off based on the sign of the difference from average of the pixels of each frame. A frame may be determined as an "on" frame when the sign of the largest single-pixel difference is positive, the sign of the sum or average of all pixel differences is positive, or the sign of a cluster of pixel differences is positive. Conversely, a frame may be determined as an "off" frame when the sign of the largest pixel difference, sum or average of all pixel differences, or cluster of pixel differences is negative.

As further shown in FIG. 7, difference frames 710, 711, 712, 713, and 714 are identified as "off" frames and difference frames 715, 716, 717, 718, and 719 are identified as "on" frames. Off frames 710-714 have a majority of negative pixel values. For example, seven out of nine pixels in difference frame 710 have negative pixel values. In addition, off frames 710-714 all have a largest single-pixel difference that is negative. For quick reference, pixels having the largest single-pixel difference, or the largest magnitude, are shaded grey. Off frames are determined in this example because the largest pixel difference is a negative number. In other examples, off frames may be identified based on the sum or average of all pixels differences in the frame being a negative number or there being a cluster of negative pixel differences in the frame.

Likewise, on frames 715-719 have a majority of positive pixel values. For example, seven out of nine pixels in difference frame 715 have positive pixel values. In addition, on frames 715-719 all have a largest single-pixel difference that is positive, as shown by the pixels shaded in grey. Based on the fact that the largest pixel difference is a positive number, on frames are determined in this example. In other examples, on frames may be determined based on the sum or average of all pixels differences in a frame being a negative number or there being a cluster of negative pixel differences.

To further distinguish the beacon beam 24*a* from the surrounding environmental noise, the one or more processors 210*b* of the second communication device 200*b* may average the differences from average of the "on" frames, including 715-719, and the inverse of the differences from average of the "off" frames, including 710-714. The identified "off" frames, including 710-714, may be inverted by changing all negative values to positive values, and vice versa.

Figure 8:
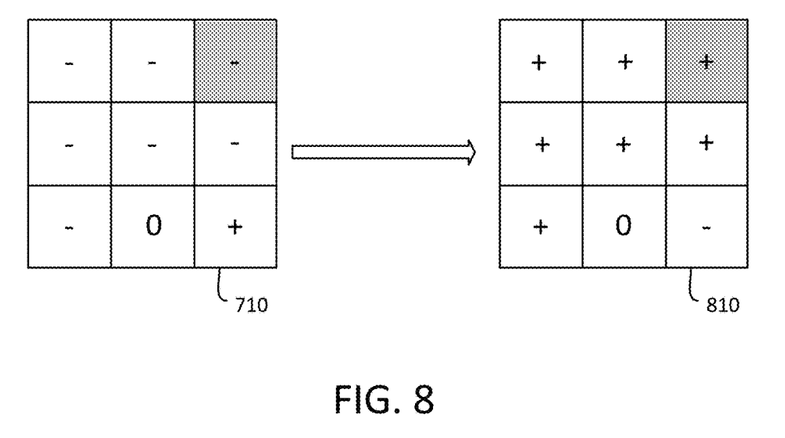
FIG. 8 is a pictorial diagram of a further example frame processing in accordance with aspects of the disclosure.

As shown in FIG. 8, the values of difference frame 710, an off frame, is inverted, resulting in inverted frame 810. All positive values become negative values and vice versa.

Figure 9:
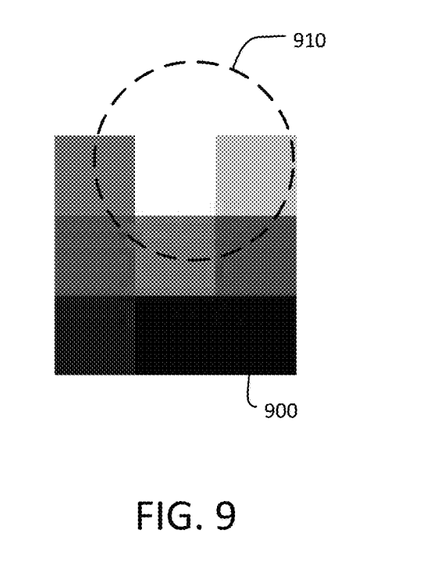
FIG. 9 is a pictorial diagram of an example processed frame in accordance with aspects of the disclosure.

With reference to FIG. 9, an average of the values for each pixel of the inverted "off" frames, including 810, and the values of the corresponding pixels of the "on" frames, including 715-719, may be calculated. The result may be an average difference frame 900 including the average difference values at each pixel location. For example, the average of the values for each pixel at a particular position of all the inverted off frames, such as inverted frame 810, and the values for each pixel at the same particular position of all on frames, including 715-719, is calculated. The resulting average difference frame 900 is shown in FIG. 9. Average difference frame 900 is 3×3 pixels, and has a lightest pixel at the top center pixel.

Using the average of the differences, the one or more processors 210*b* of the second communication device 200*b* may determine the position of the beacon beam 24*a* in the collected batch of frames. From the position of the beacon beam 24*a* in the frames, a position of the beacon beam's source in the world may be estimated. Spot centroiding or other techniques known in the art may be used to determine the beacon position in the collected frame.

As shown in FIG. 9, at the bottom row of average difference frame 900, the background has been nearly completely subtracted out, resulting in zero or near zero values, as shown by the dark color of the pixels. Average difference frame 900 has a lightest pixel at the top center pixel, followed by a next lightest pixel at the top right pixel. Therefore, using spot centroiding, the position of the beacon beam in the frame is identified by circle 910.

Using the determined beacon position in the collected frames, a relative position of the beacon source with respect to the optical system 250*b* of the second communication device 200*b* may be determined. In this case, the beacon source is the transmitter 230*a* and/or optical system 250*a* of the first communication device 200*a*. For example, the beacon position 910 shows that optical system 250*a* of the first communication device 200*a* is slightly higher and to the right of where the optical system 250*b* of the second communication device 200*b* is aimed. Furthermore, the determined beacon position in the collected frames may be used to determine an estimated absolute location of the beacon source. A pose of the optical system 250*b* of the second communication device 200*b* and/or the geographic location and orientation of the communication terminal on which the second communication device 200*b* is mounted may be known. The absolute location of the beacon source may therefore be estimated based on the determined beacon position in the collected frames and at least one of the known pose of the optical system 250*b* or the known geographic location and orientation of the communication terminal.

Based on the estimated absolute location of the beacon source, the pose of the optical system 250*b* may be adjusted by the one or more processors 210*b* so as to align the optical system 250*b* of the second communication device 200*b* with the optical system 250*a* of the first communication device 200*a*. The pose of the optical system 250*b* of the second communication device 200*b* may be adjusted to center beacon beam 24*a* in a collected frame. Namely, the optical system 250*b* may move to point more directly toward the absolute location of the beacon source, so that beacon beam 24*a* is received closer to the center of a frame collected by the optical system 250*b* of the second communication device 200*b*. For example, optical system 250*b* of second communication device 200*b* may be moved up and to the right in order to position the detected beacon beam position 910 at the center of the 3×3 pixel frame that is shown in FIG. 9. As a result, the second communication device 200*b* may be properly aligned with the first communication device 200*a* for purposes of establishing a communication link 22*a*.

To adjust the pose of the optical system 250*b*, the one or more processors 210*b* may control pointing hardware 260*b*. Pointing hardware 260*b* of the second communication device 200*b*, for example, may be a gimbal that moves the optic system 250b to point in the direction of the estimated absolute location of optic system 250a. The pointing hardware 260b may be configured to move in at least two degrees of freedom, such as, for example, yaw and pitch. Additionally or alternatively, the terminal on which the communication device 200b is mounted may be moved to position the optical system 250b for establishing a communication link 22a.

A communication link, such as communication link 22a, may be established between a first communication device 200a that transmits the beacon beam and a second communication device 200b that receives the beacon beam 24a when the first communication device 200a and the second communication device 200b are properly aligned. The communication link 22a established between the first communication device 200a and the second communication device 200b may be bi-directional. In other words, information such as communication signal 20 carrying data 23 may be transmitted from the first communication device 200a to the second communication device 200b, and vice versa. In other examples, communication link 22a may be unidirectional, in which information and data is only transmitted from the first communication device 200a to the second communication device 200b. When communication link 22a is unidirectional, an additional unilateral communication link 22b may be established between first communication device 200a and the second communication device 200b in which information and data is transmitted from the second communication device 200b to the first communication device 200a.

Additionally or alternatively, a beacon beam 24b may be transmitted by the second communication device 200b, and the first communication device 200a may detect the beacon beam 24b and establish a communication link 22b as described above. A given communication device 200 may also use the features described above to establish communication links 22 with a plurality of other communication devices 200.

In some alternatives, the optical system 250b of the second communication device 200b may be defocused prior to collecting frames in order to capture the beacon beam 24a with sub-pixel information. When the beacon beam 24a is at a distance that is within the focal distance of an optical system 250b (i.e., in focus), the beacon beam 24a may show up in only one or two pixels of a collected frame. When the beacon beam 24a is at a distance that is outside of the focal distance of an optical system 250b (i.e., out of focus), the beacon beam 24a will be blurred, and therefore will likely occupy a larger area of a collected frame than when the beacon beam 24a is in focus. The larger area allows the one or more processors 210b of the second communication device 200b to more easily detect a beacon location in the frame.

A running average of collected frames, as opposed to averaging a specific batch of frames, may be determined. In this example, an estimate of the static background may be determined by averaging frames as they are collected (in other words, a running average). Each frame is averaged with the previously collected frames with a 1/N weighting factor. Therefore, for each given frame, the estimate of the static background 630 may be updated before subtraction from the given frame is performed. In some examples, the running average for the estimate of the static background 630 is kept only after a threshold number of frames have been collected, such as one or two dozen or so. A current estimated of the static background 630 may be stored in the memory 220b, and may be modified when a frame is collected.

The beacon beam 24a may be transmitted by the first communication device 200a with low-rate data. The pattern of beacon beam modulation may be encoded with data. The on/off pattern may become essentially a bitstream which can have error-correction algorithms applied to it, etc. Since the beacon beam 24a may be seen even when the main communications link is impaired, the beacon beam 24a may be used for low-rate telemetry and/or for sending information helpful for tracking acquisition. When received by the one or more processors 210b of the second communication device 200b, the pattern may be detected, and the data may be extracted. Data that may be transmitted via the beacon beam 24a includes, for example, the identifier of the first communication device 200a, location information of the first communication device 200a, received signal strength of a beacon beam 24a from the second communication device 200b received at the first communication device 200a, and other information useful for correcting any misalignment.

To increase detectability of a beacon beam 24a, the one or more processors 210a, 210b of the first communication device 200a and the second communication device 200b may synchronize beacon beam patterns. If a given communication device 200 is transmitting and receiving beacon beams during the same time period, the optical system 250 of the given communication device may capture its own transmitted beacon beam in a collected frame, or backscatter. Beacon beam patterns that stagger the transmission times of different beacon beams and/or by using different frequencies for different beacon beams may be used to avoid backscatter. For example, a first beacon beam pattern implemented by the first communication device may have "on" periods when a second beacon beam pattern implemented by the second communication device has "off" periods, and vice versa. An "off" period of the first communication device may also overlap with a portion of an "off" period of the second communication device. To achieve this, a duty cycle of each beacon beam pattern or on/off cycle may be less than ½, such as ⅓.

In addition or in the alternative to synchronizing beacon beam patterns, a first beacon beam 24a transmitted by the first communication device 200a may have a first frequency, and a second beacon 24b transmitted by the second communication device 200b may have a second frequency different from the first frequency. The optical system 250a, receiver 240a, or the one or more processors 210a of the first communication device 200a may be configured to filter out the first frequency, and that of the second communication device 200b may be configured to filter out the second frequency. Alternatively, frames affected by backscatter may be removed from the batch of frames before an estimate of the static background 630 is determined.

When turbulence is detected by the one or more processors 210a of the first communication device 200a, the duty cycle of the beacon beam "on" period or beacon beam pattern may be increased to compensate for potential beacon fades. Especially for communication devices in high-altitude platforms 500, atmospheric turbulence may cause disruption to beacon beam transmission, such as, for example, causing scintillation or other beacon fading events from the point of view of a receiving communication device. Therefore, the one or more processors 210a of the first communication device 200a may be configured to detect turbulence (atmospheric or otherwise). Once turbulence is detected, the duty cycle of the beacon beam "on" period or pattern may be increased to increase the probability that the second communication device 200b may detect the beacon beam 24a. For example, rather than have an on/off cycle of the beacon beam 24a be 50% "on" period and 50% "off" period, the cycle may be 60% "on" period and 40% "off" period.

Figure 10:
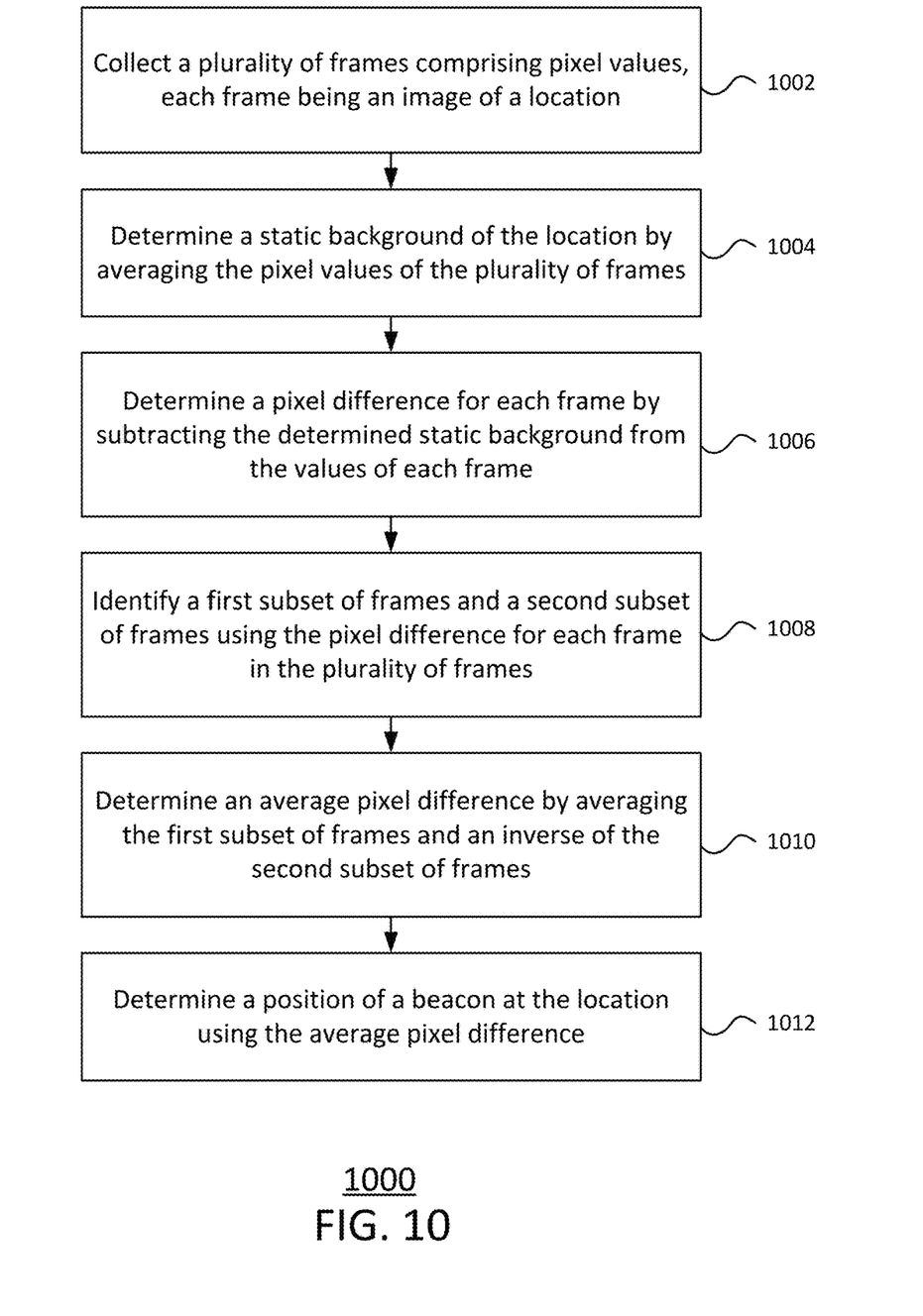
FIG. 10 an example flow diagram in accordance with aspects of the disclosure.

Shown in FIG. 10 is a flow diagram 800 in accordance with some of the aspects described above that may be performed by one or more processors 210 of communication device 200. While FIG. 10 shows blocks in a particular order, the order may be varied and that multiple operations may be performed simultaneously. Also, operations may be added or omitted.

At block 1002, a plurality of frames 600-619 is collected. Each frame is an image of a location having pixel values. At block 1004, a static background 630 of the location is determined by averaging the pixel values of the plurality of frames 600-619. In other words, pixel values of a pixel in a given position in a collected frame are averaged to obtain an average pixel value for the pixel in the given position. The average pixel value for every pixel location is calculated, and the static background 630 has the average pixel values at each pixel location.

A pixel difference is determined for each frame 600-619 by subtracting the determined static background 630 from the values of each frame at block 1006. The average pixel value for a given pixel location is subtracted from a pixel value of a given collected frame to obtain the pixel difference at the given pixel location of the given collected frame. The resulting pixel difference for each frame may be a plurality of positive and/or negative numbers.

At block 1008, a first subset of frames, including frames 715-719, and a second subset of frames, including frames 710-714, are identified using the pixel difference for each frame in the plurality of frames. Frames are identified as either "on," indicating a beacon beam is likely detected in the frame, or "off," indicating a beacon beam is likely not detected in the frame. Then, an average pixel difference is determined by averaging the first subset of frames, including frames 715-719, and an inverse of the second subset of frames, including frame 810, at block 1010. The result is an average pixel difference frame 900 having a plurality of average pixel difference values.

At block 1012, a position of the beacon at the location is determined using the average pixel difference. A location of a beacon beam in the plurality of frames is first determined based on the average pixel difference frame 900. Based on the location of the beacon beam in the plurality of frames, the position of the beacon at the location, or absolute location of the beacon, is determined.

The features described above may provide for an efficient way to detect a beacon beam location and establish a long distance optical communication link between two communication devices. A network created using the features described may provide a user with coverage that is robust to beacon inconsistencies, such as outages, fluctuations, etc., because, when the beacon is not detected, a receiving communication device interprets a beacon as being off. The network may also be robust to self-blinding or backscatter because any self-blinding or backscatter may be virtually removed as an anomalous value when the average of the collected frames is taken. Even when beacon beams are blurred or smeared in a collected frame, the features allow for the communication device to still reasonably detect and center on the beacon since much of the movement may also be factored out when the average of the collected frames is taken. A user is more likely to use the network because it may provide more reliable coverage and may also be accessible in remote areas when mounted to HAPs.

Unless otherwise stated, the foregoing alternative examples are not mutually exclusive, but may be implemented in various combinations to achieve unique advantages.

As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    collecting, at a receiver of a first communication device, a plurality of frames, each frame being an image of a location and having a resolution including a plurality of pixels, each pixel having a pixel value corresponding to a color;
    determining, by one or more processors of the first communication device, a static background of the location by averaging the pixel values of the plurality of frames collected at the receiver;
    determining, by the one or more processors, pixel difference values for each frame by subtracting the determined static background from the pixel values of each frame;
    identifying, by the one or more processors, a first subset of frames and a second subset of frames using the pixel difference values for each frame in the plurality of frames;
    determining, by the one or more processors, an average pixel difference by averaging the pixel difference values of the first subset of frames and an inverse of the pixel difference values of the second subset of frames; and
    determining, by the one or more processors, a position of a beacon of a second communication device at the location using the average pixel difference in order to align the first communication device and the second communication device for a communication link.

2. The method of claim 1, further comprising controlling, by the one or more processors, a pointing hardware in relation to the position of the beacon.

3. The method of claim 1, wherein the first subset of frames represent "on" frames in which a beacon is likely on, and the second subset of frames represent "off" frames in which a beacon is likely off.

4. The method of claim 1, wherein the first and second subsets of frames are identified based on by determining at least one of the following:
    a first sign of a greatest absolute pixel difference value of a given frame;
    a second sign of a sum of the pixel difference values of the given frame;
    a third sign of an average of the pixel difference values of the given frame; and
    a fourth sign of a cluster of pixel difference values of the given frame.

5. The method of claim 4, wherein the given frame is identified as one of the first subset of frames when a given sign is positive, and the given frame is identified as one of the second subset of frames when a given sign is negative.

6. The method of claim 1, wherein the static background of the location is further determined by:
storing the static background in a memory; and
updating the static background when a new frame is collected using pixel values of the new frame.

7. The method of claim 1, further comprising establishing, by a transmitter of the first communication device in communication with the one or more processors, the communication link with the second communication device associated with the beacon by transmitting a communication signal towards the determined position of the beacon.

8. The method of claim 1, wherein the beacon is a first beacon and the method further comprises transmitting, by the one or more processors, a second beacon, the second beacon being modulated in a square wave that is off for a first period of time when the first beacon is on and a portion of a second period of time when the first beacon is off.

9. A system comprising:
an optical system of a first communication device configured to collect a plurality of frames, each frame being an image of a location and having a resolution including a plurality of pixels, each pixel having a pixel value corresponding to a color; and
one or more processors of the first communication device in communication with the optical system, the one or more processors being configured to:
determine a static background of the location by averaging the pixel values of the plurality of frames;
determine pixel difference values for each frame by subtracting the determined static background from the values of each frame;
identify a first subset of frames and a second subset of frames using the pixel difference for each frame in the plurality of frames;
determine an average pixel difference by averaging the first subset of frames and an inverse of the second subset of frames; and
determine a position of a beacon of a second communication device in the location using the average pixel difference in order to align the first communication device and the second communication device for a communication link.

10. The system of claim 9, further comprising, a pointing hardware configured to move the optical system based on the determined position of the beacon.

11. The system of claim 9, wherein the first subset of frames represent "on" frames in which a beacon is likely on, and the second subset of frames represent "off" frames in which a beacon is likely off.

12. The system of claim 9, wherein the first and second subset of frames are identified based on by determining at least one of the following:
a first sign of a greatest absolute pixel difference value of a given frame;
a second sign of a sum of the pixel difference values of the given frame;
a third sign of an average of the pixel difference values of the given frame; and
a fourth sign of a cluster of pixel difference values of the given frame.

13. The system of claim 12, wherein the given frame is identified as one of the first subset of frames when a given sign is positive, and the given frame is identified as one of the second subset of frames when a given sign is negative.

14. The system of claim 9, wherein the static background of the location is further determined by:
storing the static background in a memory; and
updating the static background when a new frame is collected using pixel values of the new frame.

15. The system of claim 9, wherein the one or more processors are further configured to establish the communication link with the second communication device associated with the beacon by transmitting a communication signal from the optical system towards the determined position of the beacon.

16. The system of claim 9, further comprising a communication terminal on which the optical system and the one or more processors are mounted.

17. A non-transitory, tangible computer-readable storage medium on which computer readable instructions of a program are stored, the instructions, when executed by one or more computing devices, cause the one or more computing devices of a first communication device to perform a method, the method comprising:
collecting, at a receiver of the first communication device controlled by the one or more computing devices, a plurality of frames, each frame being an image of a location and having a resolution including a plurality of pixels, each pixel having a pixel value corresponding to a color;
determining a static background of the location by averaging the pixel values of the plurality of frames;
determining pixel difference values for each frame by subtracting the determined static background from the pixel values of each frame; identifying a first subset of frames and a second subset of frames using the pixel difference values for each frame in the plurality of frames;
determining an average pixel difference by averaging the pixel difference values of the first subset of frames and an inverse of the pixel difference values of the second subset of frames; and
determining a position of a beacon of a second communication device at the location using the average pixel difference in order to align the first communication device and the second communication device for a communication link.

18. The medium of claim 17, wherein the method further comprising controlling a pointing hardware in relation to the position of the beacon.

19. The medium of claim 17, wherein the static background of the location is further determined by:
storing the static background in a memory; and
updating the static background when a new frame is collected using pixel values of the new frame.

20. The medium of claim 17, wherein the method further comprises establishing, by a transmitter of the first communication device controlled by the one or more computing devices, the communication link with the second communication device associated with the beacon by transmitting a communication signal towards the determined position of the beacon.

* * * * *